US009349077B2

(12) United States Patent
Capuozzo et al.

(10) Patent No.: US 9,349,077 B2
(45) Date of Patent: May 24, 2016

(54) COMPUTER-IMPLEMENTED METHOD, A COMPUTER PROGRAM PRODUCT AND A COMPUTER SYSTEM FOR IMAGE PROCESSING

(75) Inventors: Giuseppe Capuozzo, Rome (IT); Marco Borghini, Rome (IT); Fabio Mammoliti, Cosenza (IT)

(73) Assignee: Accenture Global Services Limited, Dublin (IE)

( * ) Notice: Subject to any disclaimer, the term of this patent is extended or adjusted under 35 U.S.C. 154(b) by 135 days.

(21) Appl. No.: 13/807,629

(22) PCT Filed: Jun. 30, 2011

(86) PCT No.: PCT/EP2011/003235
§ 371 (c)(1),
(2), (4) Date: Mar. 15, 2013

(87) PCT Pub. No.: WO2012/000675
PCT Pub. Date: Jan. 5, 2012

(65) Prior Publication Data
US 2013/0170738 A1     Jul. 4, 2013

(30) Foreign Application Priority Data
Jul. 2, 2010   (EP) .................................... 10425225

(51) Int. Cl.
*G06K 9/62*   (2006.01)
*G06K 9/66*   (2006.01)
(Continued)

(52) U.S. Cl.
CPC ........ *G06K 9/6268* (2013.01); *G06F 17/30265* (2013.01); *G06K 9/00288* (2013.01); *G06K 9/00677* (2013.01); *G06K 9/66* (2013.01); *G06K 2209/27* (2013.01)

(58) Field of Classification Search
None
See application file for complete search history.

(56) References Cited

U.S. PATENT DOCUMENTS

| 6,606,411 B1 | 8/2003 | Loui et al. |
| 2003/0108241 A1 | 6/2003 | Colmenarez et al. |

(Continued)

FOREIGN PATENT DOCUMENTS

| EP | 1 681 639 | 7/2006 | |
| WO | WO 2009/090804 | * 7/2009 | ............... H04N 5/91 |

OTHER PUBLICATIONS

Angeletou, "Semantic Enrichment of Folksonomy Tagspaces," 2008, ISWC 2008, LNCS 5318, pp. 889-894.*

(Continued)

*Primary Examiner* — David F Dunphy
(74) *Attorney, Agent, or Firm* — Harrity & Harrity, LLP

(57) ABSTRACT

The present description refers in particular to a computer-implemented method, a computer program product and a computer system for image processing, the method comprising: receiving at least one user image; identifying a plurality of image classification elements of the user image by: assigning an initial classification to the user image, wherein the initial classification is based on temporal data associated with the user image; determining at least one image label that globally describes content of the user image; calculating a label correctness value for each image label; recognizing at least one image component of the user image; calculating a component correctness value for each image component; correlating the image label and the image component using the label correctness value and the component correctness value, whereby a correlated image label and a correlated image component are identified; applying a rule to determine a category of the user image, wherein the rule is based on at least one of the following: the temporal data, the correlated image label and the correlated image component; and producing a final classification of the user image including the following image classification elements: the initial classification, the correlated image label, the correlated image component, and the category.

20 Claims, 8 Drawing Sheets

(51) Int. Cl.
*G06K 9/00* (2006.01)
*G06F 17/30* (2006.01)

(56) References Cited

U.S. PATENT DOCUMENTS

| | | | |
|---|---|---|---|
| 2003/0198387 A1* | 10/2003 | Acharya et al. | 382/199 |
| 2006/0251292 A1 | 11/2006 | Gokturk et al. | |
| 2008/0263067 A1* | 10/2008 | Diederiks et al. | 707/100 |
| 2009/0079847 A1* | 3/2009 | Ohtsuka et al. | 348/231.2 |
| 2009/0161962 A1 | 6/2009 | Gallagher et al. | |
| 2010/0040285 A1* | 2/2010 | Csurka et al. | 382/170 |
| 2010/0158315 A1 | 6/2010 | Martin | |
| 2010/0278396 A1* | 11/2010 | Mitsuhashi et al. | 382/118 |
| 2011/0010421 A1* | 1/2011 | Chavez et al. | 709/204 |
| 2011/0282867 A1* | 11/2011 | Palermiti et al. | 707/722 |
| 2011/0317885 A1* | 12/2011 | Leung et al. | 382/118 |

OTHER PUBLICATIONS

"SOAP Version 1.2 Part 1: messaging Framework (Second Edition)", W3C Recommendation, Apr. 27, 2007, pp. 1-49, http://www.w3.org/TR/soap12-part1/.

Extended Search Report corresponding to European Application No. 10425225.9, mailed Dec. 13, 2010, 9 pages.

Das et al., "Event Classification in Personal Image Collections", Mulitmedia and Expo, 2009, ICME 2009, IEEE International Conference, Piscataway, NJ, U.S.A., Jun. 28, 2009, pp. 1660-1663, XP 031511095, ISBN: 978-1-4244-4290-4.

International Search Report corresponding to PCT/EP2011/003235, mailed Sep. 14, 2011, 3 pages.

* cited by examiner

COMPUTER-IMPLEMENTED METHOD, A COMPUTER PROGRAM PRODUCT AND A COMPUTER SYSTEM FOR IMAGE PROCESSING

According to an aspect, a computer-implemented method for image processing is provided. The method may comprise receiving at least one user image. The method may further comprise identifying a plurality of image classification elements of the user image by assigning an initial classification to the user image, wherein the initial classification is based on temporal data associated with the user image. Identifying the plurality of image classification elements of the user image may further comprise determining at least one image label that globally describes content of the user image and calculating a label correctness value for each image label. Identifying the plurality of image classification elements of the user image may also comprise recognizing at least one image component of the user image and calculating a component correctness value for each image component. Identifying the plurality of image classification elements of the user image may also comprise correlating the image label and the image component using the label correctness value and the component correctness value, whereby a correlated image label and a correlated image component are identified. Identifying a plurality of image classification elements of the user image may further comprise applying a rule to determine a category of the user image, wherein the rule is based on at least one of the following: the temporal data, the correlated image label and the correlated image component. The method may also comprise producing a final classification of the user image including the following image classification elements: the initial classification, the correlated image label, the correlated image component, and the category.

Identifying the plurality of image classification elements of the user image may further comprise receiving a geographic location associated with the image, and determining a place name associated with the geographic location. The final classification may further include the place name.

Identifying the plurality of image classification elements of the user image may further comprise determining an event based on the temporal data and the geographic location. The final classification may further include the event.

Identifying the plurality of image classification elements of the user image may further comprise deriving a weather indicator from the temporal data. The final classification may further include the weather indicator.

Recognizing at least one image component of the user image may further comprise recognizing a plurality of image components. Moreover, identifying the plurality of image classification elements of the user image may further comprise associating an image component classification with a first image component of the plurality of image components. The final classification may further include the image component classification.

Also, the first image component may be recognized as a face. Accordingly, the method may further comprise associating a name with the face. In this case, the method may further comprise determining a mood based on an expression of the face. The final classification may further include the name and the mood.

In some cases, the method further comprises verifying the initial classification. Moreover, the method may comprise verifying the final classification of the user image, wherein training information is received for producing a subsequent final classification of a subsequent image.

The method may further comprise associating the user image with a stored image based on the initial classification, and/or associating the user image with a stored image based on the final classification.

Receiving the at least one user image may further comprise receiving a plurality of user images. In this case, the method may also comprise retrieving at least one of the plurality of user images from an image sharing network.

The method may further comprise displaying a plurality of image classification elements, wherein each image classification element is displayed according to a number of the plurality of user images associated with the classification element. Also, the method may comprise receiving user input selecting a selected classification element from the plurality of image classification elements, and showing a preview of a selected image from the plurality of user images, wherein the selected classification element is included in the final classification of the selected image.

In addition, the method may further comprise receiving a query including at least one query term, and matching the query term to a matching classification element. The method may also comprise retrieving a matching image from the plurality of user images. It may be that the matching classification element is included in a final classification of the matching image.

Moreover, the plurality of user images may comprise a query image and a response image. In this case, the method may further comprise receiving a query comprising the query image. Also, the method may comprise matching a classification element of the query image with a classification element of the response image, and retrieving the response image in response to the query.

The method may also be implemented as a computer program product comprising computer-readable instructions, which, when loaded and executed on a computer system, causes the system to perform operations according to steps described above.

According to another aspect, a client-server system operable to process images is provided. The system may comprise a client. The client may comprise a receiving module operable to receive a user image. The client may also comprise a client image processing module operable to assign an initial classification to the user image, wherein the initial classification is based on temporal data associated with the user image. The system may further comprise a server. The server may comprise a server communication module operable to receive the user image from the client. The server communication module may be implemented as a web services module. The server may also comprise a scene detector operable to identify an image label that globally describes the user image and further operable to calculate a label correctness value for the image label. Also, the server may comprise an object identifier operable to recognize an image component of the user image and further operable to calculate a component correctness value for the image component. Moreover, the server may comprise a correlation module operable to correlate the image label and the image component using the label correctness value and the component correctness value, and further operable to identify a correlated image label and a correlated image component. Furthermore, the server may comprise a categorization module operable to apply a rule in order to determine a category of the user image, wherein the rule is based on at least one of the following: the temporal data, the correlated image label, and the correlated image component. Also, the server may comprise a final classification module operable to produce a final classification based on the initial classification, the correlated image label, the correlated image component and the category. The categorization module and the final classification module may be part of a semantic expander. The server communication module may be further operable to send the following to the client: the final classification and a reference to the user image.

TECHNICAL DEFINITIONS

An "embedded system" may be understood as a computer system or a device designed to perform one or a few dedicated functions. The embedded system may be contrasted with a general purpose computer system, e.g. a desktop PC.

A network attached storage (NAS) may be understood as an example of the embedded system that provides file-level computer data storage. The NAS may be connected to a computer network and can provide access to heterogeneous network clients. Moreover, the NAS may include one or more hard disks, where the hard disks may be arranged into redundant arrays of inexpensive/independent disks (RAIDs).

A "set-top box" (STB) may refer to another example of the embedded system. The STB may be operable to connect to a display device (e.g. a television or a computer) and an external signal source. The STB may be operable to convert a signal received from the external signal source into content which is then displayed on the display device.

An "integrated circuit" (also known as a microcircuit, microchip, or chip) may refer to a miniaturized electronic circuit that has been manufactured in the surface of a thin substrate of semiconductor material.

A "digital signal processor" (DSP) may be understood as a specialized microprocessor optimized for certain operations, possibly including the processing (e.g. conversion) of signals. In comparison to a general purpose microprocessor, a DSP may have reduced hardware complexity, reduced functionality, lower cost, better performance, and reduced power consumption.

A "system on a chip" (SoC) may refer to the integration of the components of a computer system on a single integrated circuit. Extra memory and/or peripherals may be needed in order for the SoC to achieve full functionality. The SoC may include the DSP.

A "Digital Media Processor" (DMP), also referred to as a media processor, may be understood as an SoC which is designed to process a stream of data (e.g. media such as video or audio) in real time (or near real time). The DMP may include one or more DSPs, a memory interface, a media interface, and audio/video accelerators. The DMP may be capable of decoding, transcoding (converting from one format to another), encoding, and transrating (scaling from a higher to a lower bit rate) various types of media (e.g. images) and media streams.

An "image" may be understood an artefact that has a similar appearance to a subject. In the following text, the term image refers to a still or static image. The image may be rasterized and/or encoded. Examples of images include pictures and photos. A moving image will be referred to as video.

DETAILED DESCRIPTION

In the following, a detailed description of examples will be given with reference to the drawings. It should be understood that various modifications to the examples may be made. In particular, elements of one example may be combined and used in other examples to form new examples.

The subject matter described in this specification can be implemented as a method or on a device, possibly in the form of one or more computer program products. The subject matter described in the specification can be implemented in a data signal or on a machine readable medium, where the medium is embodied in one or more information carriers, such as a semiconductor memory, or a hard disk. Such computer program products may cause a data processing apparatus to perform one or more operations described in the specification.

In addition, subject matter described in the specification can also be implemented as a system including a processor, and a memory coupled to the processor. The memory may encode one or more programs to cause the processor to perform one or more of the methods described in the specification. Further subject matter described in the specification can be implemented using various machines.

Details of one or more implementations are set forth in the exemplary drawings and description below. Other features will be apparent from the description, the drawings, and from the claims.

Figure 1:
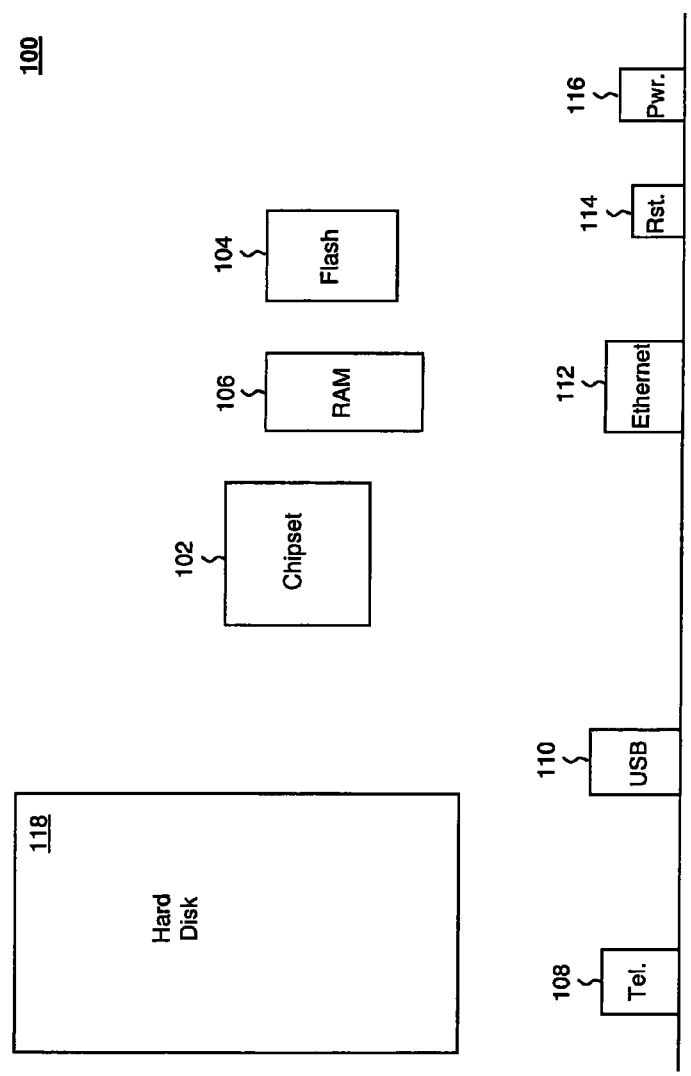
FIG. 1 shows components of an embedded system.

FIG. 1 shows components of an embedded system 100, including a chipset 102. In a specific example, the chipset 102 may be an SoC, such as a 32 bit MIPS 4KeC including audio/video hardware accelerators. In another example, the chipset 102 may be a DMP, such as the Texas Instruments TMS320DM6446 including an Advanced RISC Architecture Machine (ARM) ARM926EJ-S CPU (RISC refers to Reduced Instruction Set Computer). The chipset 102 may be a microprocessor or a microcontroller. Other implementations are also possible.

The embedded system 100 may be implemented as a NAS that provides file-based data storage services to devices on a network. Alternatively, the embedded system 100 may be a network access gateway or residential gateway that provides an Internet connection to a user network (e.g. a home network comprising one or more computers). In this case, the embedded system 100 may also be configured to provide access to networks other than the Internet. In a specific example, the embedded system 100 may be an asynchronous digital subscriber line (ADSL) modem. Modems supporting other forms of DSL are also possible.

The embedded system 100 may also be implemented as an STB or as a mobile device.

The embedded system 100 may include a user interface, e.g. a graphical user interface for managing the embedded system 100. Moreover, the embedded system 100 may run services, e.g. an application designed to help a user perform a task or a module enabling another device to be connected to the embedded system 100. Services that can be run on the embedded system 100 may or may not be related to providing access to a network connected to the embedded system 100. The graphical user interface may also be used to manage or control applications on the embedded system 100.

Some implementations of the embedded system 100 include a non-volatile memory, such as a flash memory 104. Alternatively, the embedded system 100 may include another form of non-volatile memory. The non-volatile memory of the embedded system 100 may be electronically addressable. In some cases, the non-volatile memory of the embedded system 100 may be another form of solid-state memory, such as a Silicon-Oxide-Nitride-Oxide-Silicon (SONOS) memory, or a non-volatile Random Access Memory. Other types of non-volatile memory are also possible.

The flash memory 104 may be fixed to the embedded system 100. In particular, the flash memory 104 may be built into a chip and the chip may be wired to the embedded system 100. The contents of the flash memory 104 may be referred to as a firmware.

In some cases, the firmware stored by the flash memory 104 may include an operating system for the embedded system 100. The firmware stored by the flash memory 104 may also include services that can be run on the embedded system 100, and the graphical user interface for managing the embedded system 100. Specifically, the operating system may be Linux, e.g. Linux kernel 2.6 including uClibc libraries. More specifically, the operating system could be implemented using Debian Etch for MIPS with Linux kernel 2.6.1. The operating system may have been stripped of unnecessary components and may include only what is necessary to manage the embedded system 100. The applications may be suitable for performing networking tasks such as routing, firewall maintenance, domain name service (DNS), and dynamic host configuration protocol (DHCP).

In some embodiments, the operating system allows a supporting service (e.g. drivers) for a further device to be added. For example, the operating system may support linking further functionality to the operating system kernel on demand. In other words, it may be possible to link a dynamically loadable module to the operating system. Accordingly, linking the dynamically loadable module to the firmware may be understood as linking the dynamically loadable module to the kernel of the operating system of the embedded system 100. Different kernel modules may be used to support different embedded system architectures and operating system kernels.

In addition to applications, services that may be executed on the embedded system 100 can include kernel modules, device drivers or other software that extends the functionality of the embedded system 100.

The embedded system 100 may include minimal hardware, e.g. hardware required to execute basic networking tasks and no other hardware, in order to lower costs. Moreover, the contents of the flash memory 104 (e.g. operating system and applications) may be stored on the embedded system 100 in a monolithic approach, i.e. as a single closed block.

For example, the contents of the flash memory 104 may be stored as a single closed block, e.g. as a binary image or as a compressed binary image. In other words, the flash memory 104 may contain a binary firmware image or a compressed binary firmware image. This may reduce the amount of flash memory 104 required on the embedded system 100, and thus reduce the cost of producing the embedded system 100. In addition, the use of the binary image on the embedded system 100 may be advantageous for a manufacturer or maintainer of the embedded system 100. Moreover, use of the binary image may make it simpler for a user to update the embedded system 100.

The binary image may be understood to contain the complete contents and structure representing a storage medium, e.g. the flash memory 104. A binary image may be stored in a single file.

However, storing the contents of the flash memory 104 as a binary image may have the effect that the only way to upgrade applications stored on the embedded system 100 is to perform a full firmware upgrade, as carried out in prior art methods. In other words, there has been no way to independently upgrade a single application. Instead, the full firmware upgrade has been required even for small changes to one application on the embedded system 100.

It may be difficult or undesirable to perform the full firmware upgrade for an arbitrary update of software on the embedded system 100. The full firmware upgrade may result in the use of more bandwidth, possible errors may have more sever consequences, and the full firmware upgrade may disrupt operations of the embedded system 100. For example, downloading the full firmware in order to make a small change to a single application may require more bandwidth than downloading the part of the application that is changed or the application itself. Furthermore, it is possible that the full firmware upgrade can fail, causing the embedded system 100 to become unusable. Also, the full firmware upgrade often causes an interruption of operation of the embedded system 100, since reboot of the embedded system 100 is normally required.

The embedded system 100 may further include a volatile memory, such as random access memory (RAM) 106.

Furthermore, the embedded system 100 may include a means of access connectable to an external network, such as a telephone port 108. The means of access could also be a fiber port or an Ethernet port depending on a type of the external network. The external network may be the Internet or another network.

The embedded system 100 may also include a means of access connectable to a local network, such as an Ethernet port 112. The embedded system 100 may also support wireless access, e.g. by means of wireless fidelity (WiFi). The local network may be a home network or an internal network or another network.

In addition, the embedded system 100 may include a reset button 114 that can be used to return the embedded system 100 to a standard or default configuration. The embedded system 100 may further include a power connector 116 that can be used to connect the embedded system 100 to a power source.

Moreover, the embedded system 100 may include a hard disk 118. The hard disk 118 may be implemented as a RAID.

Figure 2:
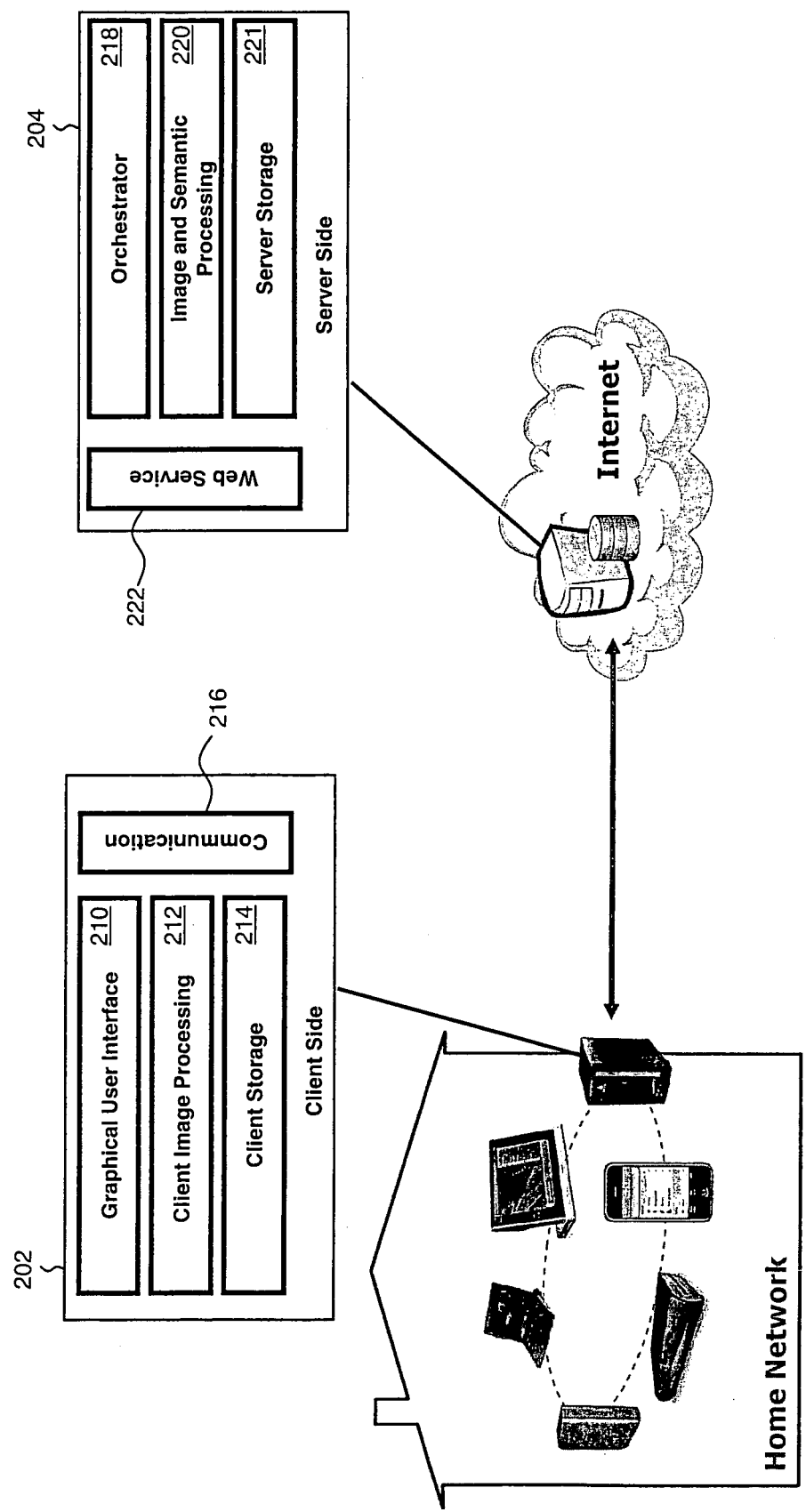
FIG. 2 depicts a high level view of an exemplary architecture of a client-server system operable to process images.

FIG. 2 depicts a high level view of an exemplary architecture of a client-server system operable to process images. The system may include a client 202 and a server 204. The client 202 may be executed on the embedded system 100. Alternatively, the client 202 may be executed on a general purpose computer or on another suitable computing device. The server 204 may be executed on one or more general purpose computers.

The client 202 may include a number of modules, such as a presentation module implemented as a graphical user interface 210, a client image processing module 212, client storage 214, and a client communication module 216. The client 202 may send images to the server 204, and may also handle user requests. For example, the client 202 may be operable to receive images. An image received from a user, e.g. received by the client 202, may be referred to as a user image.

The client image processing module 212 may include functionality to control client operations and to manage interactions between the GUI 210 and the client storage 214. The client image processing module 212 may also be operable to perform preliminary operations on images to be analyzed by the server 204, and to facilitate manual annotation of images. In addition, the client image processing module 212 may be operable to manage image retrieval operation, e.g. browsing images and searching for images.

The client storage 214 may be used to store images. The client storage 214 may also be used to store image classification elements (also referred to as image metadata) extracted by the server 204. In addition, the client 202 may be operable to assign an initial classification to an image based on temporal data associated with the image. The temporal data may be a time when the image was created. For example, if the image is a picture the temporal data could refer to the time the picture was taken. The initial classification of the image may refer to classification performed by the client 202.

The client 202 may communicate with the server 204 using the SOAP protocol (e.g. as specified in "SOAP Version 1.2 Part 1: Messaging Framework" (Second Edition) W3C Recommendation 27 Apr. 2007, available at http://www.w3.org/TR/soap12-part1/), by means of the hypertext transfer protocol (HTTP).

The server 204 may be implemented using one or more application servers.

An orchestrator 218 may perform workflow management functions. In particular, the orchestrator 218 may call other modules of the server 204 in order to process images. The orchestrator 218 coordinates interaction between the elements of the image and semantic process module 220, thereby enabling image correlation and data enrichment. In particular, the orchestrator 218 may improve the reliability of other modules by correlating information and discarding results that do not make sense when analyzed in combination. The orchestrator 218 is described in more detail with regard to FIG. 4.

An image and semantic processing module 220 may include the bulk of functionality of the server 204. In particular, the image and semantic processing module 220 may include image segmentation functionality to segment an image and extract image classification elements. An exemplary image classification element is an image component, i.e. a part of the image such as a sea, a beach, a person, or a tree. Image components may be extracted (i.e., identified) using image segmentation algorithms. Image components may also be referred to as objects or segments. Other examples of image classification elements include a label that globally identifies the image, temporal data associated with the image, a category of the image, and a classification of an image component.

Image classification elements may also include low-level image information, such as image spectrum, color variants, or intensity, as well as more complex high-level image information such as image components, faces, signs, and geographic features. Low-level information may be used for content based image retrieval (CBIR), such as a query by example search. The query by example searches may be implemented by finding an image similar to a provided image; the provided image may also be referred to as a query image. For instance, in a query by example, the user might display an image using the graphical user interface 210 and request all images similar to the image displayed. The query by example search may also be performed based on a set of images. High-level image information may be used for annotation based image retrieval.

An image annotation (also referred to as an image tag) is an example of an image classification element. Image annotations may be understood as words that describe the content of an image.

The image and semantic processing module 220 may also determine the most significant component of the image, possibly based on a combination of chromatic characteristics in the image, as well as objects, monuments, people, faces, and facial expressions depicted. Techniques used to determine the most significant component of the image may include extraction of low-level features, image texture, color distribution, image segments, shapes detected, salient points, facial recognition, and edge detection. The image and semantic processing module 220 may include a label identification module and a component identification module.

Moreover, classification elements extracted from the image may be stored along with a reference to the image by the image and semantic processing module 220. All the classification elements associated with the image may be referred to as a final classification of the image. The final classification may be performed by the server 204. The final classification may be based on the initial classification.

The final classification and the reference to the image may be sent back to the client 202. The image and semantic processing module 220 may include functionality to collect image annotations and to enrich the image annotations with further information from semantic processing. This further information may be referred to as semantic information or context information. Enrichment of the image annotations with further information may involve the use of an ontology and/or dictionaries. According to a specific example, a particular image annotated with certain image annotations (e.g. the sea, a beach, people, a tree) may be enriched by applying a semantic rule to categorize the particular image as a summer holiday. Thus, continuing the example, enriching the particular image with semantic information may involve assigning a category to the particular image based on image annotations assigned to components of the image.

The image and semantic processing module 220 may enable techniques of image segmentation, automatic image annotation, and multiple types of image searching to be integrated in a way that allows the enrichment of image tags using semantic analysis of the images themselves. This may facilitate retrieval of an image in response to a user query expressed in a natural language (i.e. without using predefined terms or queries). Because of the image and semantic processing module 220, a user does not necessarily need to enter keywords into the graphical user interface 210, but can instead request images using expressions in human language. The image and semantic processing module 220 may analyze the user query, e.g. by deriving one or more concepts from terms of the user query and matching the derived concepts to image classification elements (e.g. image annotations). The image and semantic processing module 220 may also match query concepts derived from the user query with image concepts derived from the image classification elements.

The image and semantic processing module 220 may be the most complex part of the image processing system. Also, image and semantic processing module 220 may be realized as a learning machine able to get feedback from users in order to improve its results. For example, image and semantic processing module 220 may be implemented by means of a support vector machine. The support vector machine (SVM) may be understood as a set of related supervised learning methods that can be used for classification. The SVM may be provided with a set of training examples, each marked as belonging to one of two categories. A training algorithm may then be used to build a model that determines whether a new example falls into one category or another. Training examples may be understood as a subset of training data.

Server storage 221 may be operable to store image information such as image classification elements and references to associated images. For example, the server storage 221 may include mappings between geographic location information and place names, mappings from events to geographic locations and temporal data, lists of points of interest, semantic concepts, training data, user account information, etc. The geographic location information may be obtained in a number of ways. For example, the geographic location information may be captured by a GPS device integrated with a camera, a stand-alone GPS device or may be manually entered by a user.

A web services module 222 may facilitate access to the server 204 by the client 202. The web services module 222 may also include a web server and a server communication module. In some cases, the orchestrator 218 may be implemented as part of the web services module 222.

The image and semantic processing module 220 may also include a community crawler module (not shown) operable to retrieve content from an image sharing network, i.e. a network that facilitates the sharing of images. The image sharing network may be a social network, such as Facebook (Facebook is a trademark of Facebook Inc.). In some cases, the community crawler may be implemented as part of a social network adapter. The image sharing network may also be a photo sharing network such as Google Picasa (Google and Picasa are trademarks of Google Corporation), flickr, or Kodak. Gallery (Kodak and Kodak Gallery are trademarks of the Kodak Corporation). Specifically, an adapter component of the web services module 222 may be operable to gather images from albums of a social network (SN) to which a user is registered, and index the gathered images together with the images stored in the client storage 214.

Advantageously, when the user searches for an image, the user does not need to access multiple accounts (e.g. the social network account) but can search for the image using the graphical user interface 210. Accordingly, the client 202 and the server 204 will retrieve all images matching the user search regardless of the storage location of the images. Thus, content from different sources is realized in a single view.

Moreover, the orchestrator 218 may be configured to orchestrate all communication flows involving the server 204. This may improve scalability and modularity of the server 204. In particular, the image and semantic processing module 220 may be implemented as a closed, proprietary system. Accordingly, using the orchestrator 218, it is possible to incorporate new modules into the image processing system without modifications to the image and semantic processing module 220; only the orchestrator 218 would be impacted.

In some cases, a large number of images may be stored using the client storage 214. The client 202 may be connected to a display device, such as a television, in order to show a catalog of stored images, automatically organized by category. Automatic classification may be performed by means of the extracted image classification elements. Furthermore, the graphical user interface 210 can be used to search for images using a variety of methods, for example using natural language queries or query by example as described above.

Moreover, the server 204 may process images and store image classification elements for multiple users, e.g. a home network community. Possibly in conjunction with other applications, such as a photo album service, a user may be able to retrieve photos from various members of the home network community by means of interaction with the client 202. The server 204 may include access lists to ensure that users only accesses images that they are entitled to access.

Figure 3:
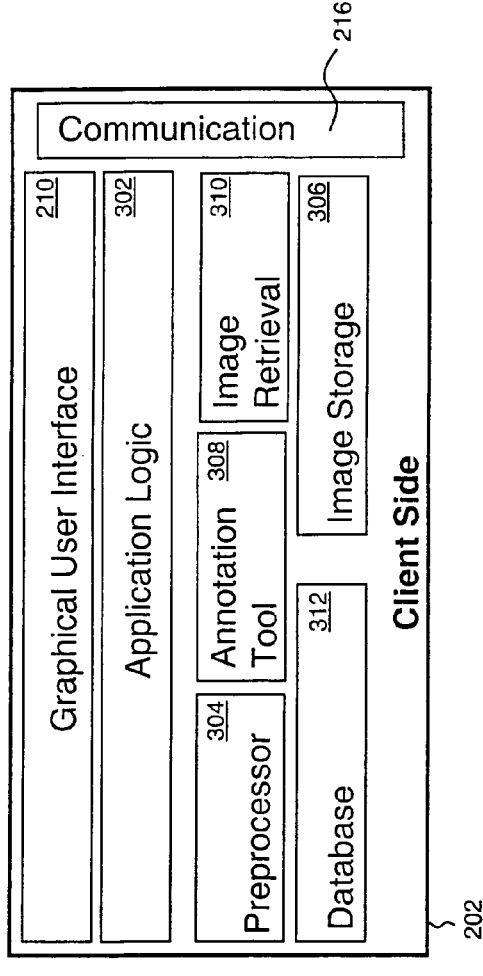
FIG. 3 shows another architecture of the client part of the client-server system.

FIG. 3 shows another architecture of the client 202, in accordance with certain disclosed embodiments. The architecture provides a more detailed look at the client 202 compared to what is shown in FIG. 2. The architecture contains a plurality of modules.

The graphical user interface (GUI) 210 may enable a user to interact with the client 202. In some cases, the GUI 210 may be dependent on the hardware implementation of the client 202. For example, if the client 202 is implemented as a NAS or a network access gateway, the GUI 210 may be realized as a set of dynamic web pages accessible through the Ethernet port 112. If the client 202 is implemented as an STB, the GUI 210 may be realized as a graphical application to be displayed on a television and controlled through a remote control.

The client communication module 216 may manage communications with the server 204. In particular, the communication module 216 may use the SOAP protocol as part of a web service paradigm, e.g., Extended Markup Language (XML) requests over HTTP.

The client 202 may also include application logic 302. The application logic 302 may be used to control operations on the client 202 by managing interactions between the GUI 210 and other modules of the client 202.

In addition, the client 202 may include a preprocessor 304. The preprocessor 304 can perform preliminary operations on an image. In particular, the preprocessor 304 may include an initial classification module, operable to assign an initial classification to the image. Classification performed by the preprocessor 304 may serve as a basis for further classification performed by the server 204. In other words, the initial classification of the image may server as a basis for a final classification of the image.

The initial classification assigned by the preprocessor may be based on temporal data (e.g. a timestamp including a day, a month, and a year that the image was created) associated with the image. For example, if the image is a picture, an initial classification of the picture may be derived from a date when the picture was taken.

In some cases, a received image timestamp is compared with timestamps of previously stored images. The previously stored images may be associated with one or more events, where each event may refer to an occurrence during which multiple images were created. Examples of events include personal events such as a summer holiday, a birthday, or an anniversary. Events may also refer to publicly recognized occurrences, such as the Oktoberfest.

If the received image timestamp is found to be sufficiently close to a timestamp of one of the previously stored images, an event associated with the previously stored image may also be associated with the received image. For example, if the received image and a previously stored image were taken within three days of each other, the received image and the previously stored image may be associated with the same event. Moreover, image classification elements associated with the event may also be associated with the received image. If the received image timestamp is not sufficiently close to any previously stored image timestamp, a new event may be created for the received image. If multiple images are received, and the multiple images have associated timestamps that are sufficiently close to each other, the multiple images may be associated with the same event.

Accordingly, assigning an initial classification to a received image may include associating the received image with a previously stored image, i.e. associating the received image and the previously stored image with the same event.

For example, Alice, using the image processing system, has already produced a final classification of user images associated with the summer holidays of Alice and Bob. The images have associated temporal data indicating a date between 1 and 15 Aug. 2009. The final classification includes correlated image components with annotations such as "holiday, summer, sea, Capri, Alice, Bob". Thus, each image may have multiple image components and multiple image annotations.

Continuing the example, Bob sends Alice his pictures of the summer holidays and Alice uploads Bob's pictures to the client 202. The preprocessor 304 determines that the temporal data associated with Bob's pictures indicates a date between 1 and 15 Aug. 2009. The preprocessor 304 may assign an initial classification to Bob's pictures that includes image classification elements of the final classification produced for Alice's images. The initial classification assigned to Bob's pictures may provide the server 204 with a starting point for analysis and disambiguation. For instance, if during the course of identifying image classification elements, the image processing system is unable to distinguish between Bob and another person, the system could exclude the other person, since the set of pictures is associated with holidays for Alice and Bob.

Thus, it may be an advantage that limitations in certain modules, e.g. a facial recognition module, can be compensated for by correlating newly identified image components, such as a recognized face, with a previously stored final classification.

The initial classification may be verified by presenting a result of the initial classification to a user. The user may accept the initial classification or associate the received image with another event. Also, the user may create a new event and associate the received image with the new event. Once verification has been performed, the received image may be stored in image storage 306. The previously stored images referred to above may be retrieved from the image storage 306.

The client 202 may also include an annotation tool 308. The annotation tool 308 can be used to facilitate manual tagging of images. In other words, the annotation tool 308 may be used to associate descriptive terms with an image. The annotation tool 308 may be used before initial classification, after initial classification, before final classification, or after final classification. Input obtained by the annotation tool 308 may be used by the server 204.

An image retrieval module 310 may enable the user to obtain images from the image storage 306. In particular, the image retrieval module 310 may provide several ways to browse images. For example, one of the following image searching methods may be used:
  browse by image classification element (e.g. event, person's name, place name, temporal data),
  browse by tag cloud,
  natural language query,
  query by example.

The image searching methods can be combined and may be accessible from the same page of the GUI 210. In one example, a user can start browsing by event, then refine the search using the tag cloud, natural language query or the query by example. The image searching methods will be explained in more detail in connection with FIG. 4.

The image retrieval module 310 may also interface with the server 204, e.g. for semantic analysis of a natural language query. In some cases, semantic analysis may involve replacing natural language terms with ontology concepts. The ontology concepts may capture semantics such as words that have the same meaning, concepts that are part of other concepts, subconcepts, or self-defined relations. The ontology concepts derived from the query may be refined using available classification elements and in view of interrelations with other ontology concepts.

The image retrieval module 310 may include a search engine.

A database 312 may be used to store image classification elements derived from image analysis, personal user information, or another source. Image classification elements in the database 312 may include birthdays, anniversaries, face-name associations, etc.

Accordingly, an image may be received (e.g. uploaded) at the client 202 in a number of ways.

In a first example, the GUI 210 may be accessed from a personal computer (PC). In this case, a user may have images stored on the PC. For example, the images may have been copied from a digital camera to a folder on the PC or downloaded from the Internet or placed on the PC in another manner. The GUI 210 may receive user input by means of a connection of a standard web browser to the GUI 210. The GUI 210 may be used to select single images or entire folders to be uploaded to the client 202. Once the selection is confirmed, the selected images are transferred to the client 202, possibly for initial classification by the preprocessor 304. Once the initial classification has been performed, the GUI 210 may display a verification page to enable the user to confirm the initial classification or select an alternative classification.

In a second example of how an image may be received, a shared folder on the client 202 may be accessed, and images may be copied from a PC to the shared folder (e.g. by drag-and-drop, copy and paste, use the command line, etc.). Once the copying of images has been completed, the GUI 210 may receive an external connection. In response to the external connection, the client 202 may generate a notification that new content needs to be processed. The client 202 may receive a response to the notification which activates the preprocessor 304 and starts initial classification of the images.

In a third example of how an image may be received, a USB storage device such as a digital camera may be connected to the USB port 110. Accordingly, the client 202 recognizes the USB storage device using a previously installed driver. The client 202 may scan the USB storage device for images, which are then transferred to the image storage 306. Once the transfer process is complete, the preprocessor 304 may be activated via the GUI 210 in order to perform initial classification of the images.

Figure 4:
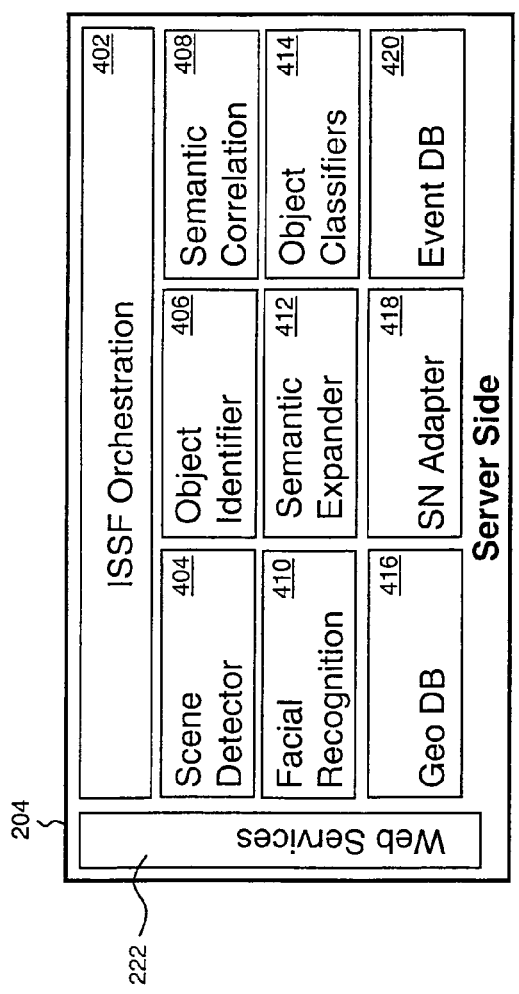
FIG. 4 shows another architecture of the server part of the client-server system.

FIG. 4 shows another architecture of the server 204, in accordance with certain disclosed embodiments. The architecture provides a more detailed look at the server 204 compared to what is shown in FIG. 2. The server 204 includes a plurality of modules.

The server 204 includes the web services module 222. The Web services module 222 may be understood as the counterpart of the client communication module 216 and facilitates communication with the client 202. Also, the Web services module 222 may include a server communication module operable to receive an image from the client 202. The server 204 may receive the image along with the initial classification of the image from the client 202. Alternatively, the server 204 may receive the image along with one or more image classification elements. For example, the server 204 may receive the image with along with temporal data (e.g. a time when the image was created), and geographic coordinates (e.g. latitude and longitude).

The web services module 222 may include a dedicated web service operable to receive the image via HTTP.

The received image may be passed from the web services module 222 to an image semantic search framework (ISSF) orchestration module 402. The ISSF orchestration module may be understood as a specific implementation of the orchestrator 218. The ISSF orchestration module 402 performs workflow management functions. In particular, when a new image is received by the server 204, the ISSF orchestration module 402 calls other modules of the server 204 in order to analyze the image; the ISSF orchestration module 402 may aggregate results of the image analysis and enhance image comprehension. The ISSF orchestration module 402 may include a final classification module. The results of the image analysis may be combined in a final classification.

The final classification may include one or more of the following image classification elements:
  a scene description (i.e. an image label),
  a list of image components depicted in the image,
  image component classifications,
  names of people depicted in the image,
  moods of the people depicted in the image,
  temporal data,
  a weather indicator,
  event information,
  a category derived based on application of a semantic rule,
  a place name.
  The image components and the scene description may be correlated.

In one example, the ISSF orchestration module 402 may send the received image to a scene detector 404.

The scene detector 404 may be operable to determine a general meaning of the received image. In other words, the scene detector 404 may identify a label that globally describes the received image. Thus, the label describes the entire content (i.e. all image components) of the received image. The scene detector 404 may be further operable to calculate a label correctness value for the label.

An object identifier 406 may be operable to recognize components of the received image. In particular, the object identifier 406 may segment the received image and determine information about recognized components, e.g. as elaborated in the description of FIG. 5. Extracted information may include a location of each recognized component in the received image. Also, the object identifier 406 may calculate component correctness values for each recognized component.

A goal of the scene detector 404 and the object identifier 406 is to calculate the probability that a particular concept is actually represented in the received image. Both modules may be understood to use similar approaches. A difference between the scene detector 404 and the object identifier 406 is the objective of analysis. In the case of the scene detector 404, the received image is considered and analyzed as a whole in order to identify a label that globally describes the received image. In contrast, with regard to the object identifier 406, the received image is first segmented into smaller regions and then analyzed in order to recognize individual components of the received image.

A methodology that can be common to the scene detector 404 and the object identifier 406 involves extracting a set of characterizing features from the received image and matching the set of extracted characterizing features with a dictionary (also referred to as a codebook). Each characterizing feature may be understood as a mathematical representation of the image. An example of a characterizing feature is a color histogram, i.e. the distribution of colors in the image. The dictionary defines mappings between values of characterizing features and concepts. Also, the dictionary may define mappings between values of characterizing features and image components.

Depending on the characterizing feature to be extracted, image processing by the scene detector 404 and the object identifier 406 may involve performing some computations on the received image in full-color, while other computations may be performed on a black and white version of the received image. Still further computations may be performed on single color channels of the received image.

For example, the elements of the dictionary can be represented as {characterizing feature values, concept} pairs. According to the example, the characterizing feature values relate to components extracted from reference images, and the concept is an annotation associated with those values. By evaluating the difference between the values of characterizing features extracted from the received image and the characterizing feature values in the dictionary, a probability that the concept is associated with the received image may be calculated.

In another example, there are a number of images depicting the sea and others depicting fire. Color histograms for images of the sea will have higher values for blue and green components, while color histograms for images of the fire will have higher values for the red components. According to the example, the number of entries in the dictionary is equal to the number of images. Each entry will include the color histogram of an image and a manually associated concept (i.e. sea or fire in this example). Once built, the dictionary will be used as a reference for classifying new pictures: for each new image, the color histogram is computed and compared with those in the dictionary through a learning machine classifier, such as a support vector machine (SVM). The output of the SVM is the probability that the color histogram associated with the new image is similar to the color histogram associated with a reference image in the dictionary. Since color histograms are associated with concepts in the dictionary, the output of the SVM is the probability that an image represents a concept (e.g. the concept associated with the reference image). Note that a color histogram is only one example of a characterizing feature.

In the case of the scene detector 404, the overall picture is analyzed, focusing on the background. In one example, before extracting the features, the scene detector 404 applies a Gaussian filter to the received image in order to smooth discontinuities. The visual effect of a Gaussian filter is to blur the received image, so that it appears flattened; in this way, foreground elements are blended with background elements, providing a more homogenous image.

After filtering, characterizing features (e.g. the color histogram) are calculated and matched to the characterizing features in the dictionary. A perfect match is generally impossible, except in the case where the received image is identical to an image in the dictionary. Thus, matching may be performed using a machine learning classifier, such as a Support Vector Machine (SVM) or a Fisher classifier. In some cases, a set of training examples is supplied. Training examples may also be referred to as model or template images. Each training example is marked as belonging to one of two categories, and an SVM training algorithm builds a model that predicts whether a new example falls into one category or the other. In this case, categories are concepts and the SVM is extended to support more than two categories (Multiclass SVM). The SVM may output a label correctness value.

The object identifier 406 may use an approach similar to that of the scene detector 404. A goal of the object identifier 406 is to determine if an image component belongs to an image, instead of analyzing the whole image. Accordingly, the object identifier 406 may analyze smaller segments of the received image. The segments can be compared to reference objects (also referred to as visual words). Thus, in an isolation phase, the received image may be decomposed using techniques such edge detection and corner detection. These techniques can be used to isolate shapes through a gradient analysis. A principle behind the isolation phase is that edges of image components may be located where the gradient has a maximum; this is the opposite of the situation with the scene detector 404, where a Gaussian filter is applied to minimize differences in the gradient. After the isolation phase, characterizing features of each region of the received image (e.g. color histogram and contours) can be computed. These characterizing features can then be matched with those characterizing features extracted from images of reference objects. Matching can be performed using a machine learning classifier as described above with respect to the scene detector 404. The machine learning classifier may output component correctness values.

A number of training examples may exist for each image label and each image component. In general, the more training examples there are for an image label or an image component, the more likely it is that the label or component can be identified with a high probability. In other words, as the number of training examples associated with an image label increases; the label correctness value for received images that can be globally described with that image label may increase (i.e. go toward a perfect match). The same applies for an image component correctness value. Advantageously, the number of training examples can be increased as more images are received by the client 202 and processed by the image processing system. Moreover, feedback from the user can be used to improve determination of image labels and recognition of image components, e.g. by associating identification data with training examples.

An example involving the object identifier 406 may help illustrate the use of training examples by the object identifier 406 and the scene detector 404. If the received image is a picture of a hummingbird (or a picture including a hummingbird), and there are no pictures of birds in the set of training examples, then the object identifier 406 may not recognize that there is a bird in the received image. If there are pictures of birds in the set of training examples, and the pictures are generally classified as birds without any more specific classification, then the object identifier 406 may recognize the hummingbird as a bird and the associated image component correctness value may be proportional to the number of pictures of hummingbirds in the set of training examples. Thus, the image component correctness value and the label component correctness value may depend on the number of images in the set of training examples and how the images are classified (e.g. the annotations associated with the training examples).

In some cases, the label correctness values and the component correctness values may be implemented as percentages. A label correctness value may indicate a likelihood that the corresponding label accurately describes the received image. In other words, the label correctness value is a probability that the image represents a particular scene (e.g. outdoor, indoor, sea, forest, cityscape) identified by the label. A component correctness by may indicate a likelihood that the corresponding component has been accurately identified.

A semantic correlation module 408 may correlate labels with image components using the label correctness values and the component correctness values. The semantic correlation module 408 may identify at least one correlated label and at least one correlated image component. In other words, the semantic correlation module 408 disambiguates the output of the scene detector 404 and the output of the object identifier 406.

A facial recognition module 410 may be operable to identify faces in an image and associate names with the identified faces. For example, if the object identifier 406 recognizes a plurality of image components, the facial recognition module 410 may identify a face within the plurality of components. Different image components may be recognized using different techniques. For example, faces may be recognized using different techniques in comparison to other image components. In some implementations image component classifications are only associated with faces and not with other image components.

In some cases, names are associated with faces based on training data, e.g. training examples. Similar to the scene detector 404 and the object identifier 406, the facial recognition module 410 may require more than one training example (possibly photos taken from different angles) in order to recognize a face. The computations performed by the facial recognition module 410 may be made more efficient by utilizing known characteristics of faces (i.e. facial features). Training data for the facial recognition module 410 will be discussed in more detail below.

In addition, the facial recognition module 410 may also be operable to determine moods based on facial expressions of the identified faces.

A semantic expander 412 processes image classification elements identified by other modules of the server 204 in order to enrich them. In particular, the semantic expander 412 may apply a rule in order to determine a category of the received image. The rule may be applied using the temporal data, each correlated image label and each correlated image component. Moreover, the semantic expander 412 may add contextual information based on semantic analysis of text-based image classification elements. The semantic expander 412 may also resolve query terms in a query received from the client 202. The rule applied by the semantic expander 412 (i.e. the semantic rule) and the added contextual information are elaborated in more detail below via the discussion of a specific example.

The server 204 may also contain object classifiers 414. For certain types of image components, the object classifiers 414 may be operable to associate an image component classification with an image component. For example, if the image component is a car, the object classifiers 414 may be operable to associate a model designation with the car. The object classifiers 414 may be expanded to classify further image components simply by modifying a workflow in the ISSF orchestration module 402. In this context the workflow may be understood as a sequence of connected steps. Thus, because of the particular architecture of the server 204, adding new object classifiers may merely require performing additional steps to classify components associated with the new object classifiers. The operation of other components and the rest of the image processing may be unaffected.

The object classifiers 414 may also allow the server 204 to be used in a number of different contexts, such as a consumer context or a business context. For example, in the consumer context, the client 202 may be part of a home network. Alternatively, in the business context, the client 202 may be part of a corporate network. Other contexts are also possible.

A geographic database 416 may include mappings between geographic locations and place names. A place name may refer to a city (e.g. Seattle), a region (e.g. Shaw Island), a building (e.g. the Sistine Chapel), etc. The geographic database 416 may also include a list of points of interest as well as contextual information associated with the geographic locations. A point of interest may be understood as a location that someone may find useful or interesting (e.g. a point on the Earth representing the location of the Space Needle). The contextual information may include material of interest to a traveler visiting the corresponding geographic location. The information in the geographic database 416 may facilitate the identification of image labels and image components. Geographic locations may be represented as geographic coordinates, possibly including one or more of the following:

a latitude and longitude,
a bearing or direction, and
a street address.

A social network (SN) adapter 418 may facilitate communication between the server 204 and an image sharing network associated with the user. The image sharing network may be a social network such as Facebook or a photo sharing network such as flickr. The SN adapter 418 may enable content of the image sharing network to be indexed by the server 204. The SN adapter 418 may also be operable to retrieve images from the image sharing network. The SN adapter 418 may be integrated with a particular type of image sharing network. Other adapters may be used to facilitate communication with different image sharing networks, e.g. image sharing networks with different APIs. Each image sharing network communicated with by the SN adapter 418 may have a set of public application programming interfaces (APIs) that allow access to a user's image gallery. The user's image gallery may refer to images associated with the user on the image sharing network.

In order to register with the image sharing network, the user can access the GUI 210. The user can then select one or more image sharing networks, and provide authentication information (e.g. a username and a password) for each selected network. The client 202 may forward the authentication information to the ISSF orchestration module 402 which may verify the validity of the user name and password with the selected image sharing network and activate the SN adapter 418.

After activation, the SN adapter 418 can be configured to connect to the image sharing network at regular intervals (e.g. once a day) using the user's authentication information. After a successful connection, the SN adapter 418 may access the image gallery of the user. Each image in the image gallery that does not have a final classification is retrieved by the SN adapter 418 and passed to the ISSF orchestration module 402. The ISSF orchestration module 402 may then identify classification elements in order to produce a final classification of the retrieved image. Once the final classification has been produced, the final classification and a reference to the retrieved image can be sent to the client 202 and stored in the database 312.

The process of retrieving an image from the image sharing network may be performed in the background, e.g. at night in order to reduce network and system load. Optionally, the client 202 may be operable to prompt the user to verify classification elements of the final classification of the retrieved image when the user connects to the GUI 210.

In some cases, identified image classification elements are automatically verified after a predetermined period of time.

Advantageously, the SN adapter 418 can enable a user to have a unique and consistent view of all his images. Thus, the user can access all of his images through the graphical user interface 210. The user does not need to separately access each of the image sharing networks he is registered with, but can instead access all images from one place. In other words, with a single search the user gets access to his whole image library, resulting in a simplified search process.

An event DB 420 includes information about occurrences, such as public events (e.g. a contest, a festival, or a sporting event). The event DB 420 may also include personal event information associated with particular, e.g. a birthday, or an anniversary. Events may be part of the context of an image. Events may also be associated with temporal data or with a geographic location.

After the server 402 finishes processing a received image, the final classification may be sent to the client 202. The final classification may include some or all of the identified image classification elements. Accordingly, the received image may be displayed using the GUI 210. In some cases, identified image classification elements (e.g. image components such as faces) of the received image are highlighted and described.

The client 202 may be operable to receive verification of identified image classification elements from a user. In this case, the identified image classification elements are stored in the database 312 and made ready for future retrieval. In addition, a positive indication may be sent to the ISSF orchestration module 402, which in turn notifies other modules of the server 204 regarding the outcome of the verification. Accordingly, the modules of the server 204 may update their training data based on the verification.

Also, the client 202 may be operable to receive modifications and/or additional details from the user. In this case, the user can modify identified image classification elements, e.g. the user can modify names associated with faces or change an identifier of a recognized image component. Thus, if an image component is recognized incorrectly, a face is incorrectly named, or a face is not named at all, the client 202 can receive corrections from the user. The user may submit changes, which can be stored in the database 312, and forwarded to the ISSF orchestration module 402. The ISSF orchestration module 402 can pass the modifications to the other modules of the server 204, which can update their training data accordingly.

A specific example of the processing of a user image received by the server 204 from the client 202 will now be described. According to the example, the image may be transferred from the web services module 222 to the ISSF Orchestration module 402. The ISSF Orchestration module 402 may also receive temporal data associated with the image (e.g. in the case of a picture, the time the picture was taken), and a geographic location associated with the image.

The received image may depict a coast with people in the foreground. The scene detector 404 may determine five image labels, where each image label globally describes the content of the received image. Each image label may be associated with a label correctness value. For example, image labels and associated label correctness values are depicted in the following table:

| Image label | Correctness Value |
| --- | --- |
| Coast | 70% |
| Sky | 65% |
| Mountain | 30% |
| Forest | 5% |
| Highway | 3% |

Accordingly, the highest label correctness value is associated with the "Coast" image label, whereas the lowest label correctness value is associated with the "Highway" image label. As can be seen from the table above, there is some ambiguity in the received image. In this case, the scene detector 404 cannot definitively determine whether the coast or the sky is predominant since both image labels have similar label correctness values.

Continuing the example, once the image labels and corresponding label correctness values have been determined, the received image may be passed to the object identifier 406. The object identifier may generate a set of image components and component correctness values similar to set of labels and values depicted in the table above. In the example, the object identifier 406 may determine that the image contains "people", "rocks", and "a boat", with high associated correctness values.

The ISSF orchestration module 402 may correlate the results generated by the scene detector 404 and the object identifier 406 using the semantic correlation module 408. For example, the ISSF orchestration module 402 may be able to use the people, rocks, and the boat identified by the object identifier 406 in order to exclude the possibility that the "Sky" image label globally describes the content of the received image. For example, if the highest label correctness value and the second highest label correctness value are similar, the image components identified by the object identifier 406 can be used to exclude one of the image labels.

Alternatively, if during the processing of an image a definitive image label is identified with a much higher correctness value than any other identified image label, the ISSF orchestration module 402 and the semantic correlation module 408 may be able to use the definitive image label to identify ambiguous image components. In this case, ambiguous image components may have similar associated correctness values (e.g. within 10% of each other) and may corresponding to the same depicted object. For example, if object A is recognized as a bird with a 50% associated correctness value and object A is also recognized as a hanging light with a 45% associated correctness value, then the definitive scene label of "beach" could be used to exclude the "hanging light".

After correlation, the ISSF orchestration module 402 may use the geographical database 416 to determine a place name associated with the geographic location of the image. According to the example, the image is a picture taken in Capri. The ISSF orchestration module 402 may also determine at least one point of interest based on the geographic location. In this case, the Faraglioni is identified as a point of interest associated with Capri. Faraglioni may be associated with the rocks previously identified as an image component. Thus, the ISSF orchestration module 402 identifies Capri and Faraglioni as image classification elements of the received image. These image classification elements may be incorporated into the final classification.

In addition, the ISSF orchestration module 402 may derive a weather indicator from the temporal data associated with the received image. For example, the weather indicator may be a season (e.g. summer) corresponding to the temporal data. Moreover, the ISSF orchestration module 402 may search the event database 424 for events related to the temporal data and the geographic location. The events may be public events, e.g. the Faraglioni Capri Prize, or personal events, e.g. a wedding or a party. Personal events may be configured by a user. Events found to be related to the temporal data and the geographic location may be identified as classification elements and incorporated into the final classification. At this stage, identified image classification elements may include the following (component position and other low-level image features have been omitted for clarity):

{25/08/2009. Summer, {Faraglioni Capri Prize, Alice's birthday}}, Coast, (Capri, {Rocks, {Point of Interest. Faraglioni}}, People, Boat Accordingly, the ISSF orchestration module 402 may pass the received image to the facial recognition module 410. The facial recognition module 410 detects faces among the recognized image components and attempts to associate a name with each face. The facial recognition module 410 may extract a facial expression from an identified face, and may also determine a mood (e.g. happy, sad, crying, laughing) based on the facial expression. Thus, after the received image has been processed by the facial recognition module 410, the identified image classification elements may include the following:

{25/08/2009, Summer, {Faraglioni Capri Prize, Alice's birthday}}, Coast, {Capri, {Rocks, {Point of Interest, Faraglioni}}}, Boat, {People, {Alice, {laughing, happy}}. {Bob, {happy}}

Subsequently, the identified image classification elements may be passed to the semantic expander 412. The semantic expander 412 may apply one or more semantic rules to the identified image classification elements in order to determine a category of the received image. According to the example, since the received image was taken in the summer and near a point of interest associated with tourism, the received image is categorized as a holiday. The category may be added to the identified image classification elements. Moreover, additional contextual information may be associated with the received image based on the category, e.g. similar concepts such as vacation, journey and travel.

A semantic rule may defined using XML. For example an image meeting the criteria of the following semantic rule may be categorized as a "holiday",

```
<concept name="holiday">
  <includes type="optional" name="sea">
    <includes type="optional" name="beach"/>
    <includes type="optional" name="boat"/>
    <includes type="optional" name="umbrella"/>
    ...
  </includes>
  <includes type="optional" name="mountain">
    <includes type="optional" name="wood"/>
    <includes type="optional" name="lake"/>
    <includes type="optional" name="animal"/>
  </includes>
  <includes type="mandatory">people</includes>
  ...
</concept>
```

After processing is complete, a final classification of the received image is produced based on the identified image classification elements. The final classification is sent to the client 202, which stores the final classification in the database 312, along with the image.

Multiple image searching methods enabled by the image retrieval module 310 in view of the final classification will now be discussed in more detail.

A simple way to search for images is to choose a group of image classification elements to use for navigating images in the image storage 316. Once a group of image classification elements (e.g. all events) has been selected, a list of the image classification elements in the selected group are displayed (i.e. all events are displayed). An image classification element (e.g. Alice's birthday) can then be selected, and it is possible to browse images associated with the selected image classification element. Groups of image classification elements that can be selected include:

events,
people,
locations,
temporal data.

Other groups of image classification elements may also be selected, such as moods or image labels.

Another way to search for images is to browse by tag cloud. Statistics about classification elements may be maintained in the database 312. Each time a new final classification is added to the database 312, statistics for each image classification element in the new final classification can be updated. A subset of the classification elements in the database 312 may be presented in a cloud, where each image classification element has a font size proportional to the number of occurrences of that classification element in the database 312. In response a selection of a classification element presented in the cloud, the GUI 210 may show previews of images associated with the selected classification element. In other words, the images previewed may have a final classification that includes selected the classification element. Also, in response to the selection, the tag cloud can be updated so that only the classification elements most relevant to the previewed images are displayed. The tag cloud can be refined further and the number of previewed images can be decreased in response to additional user input.

Yet another way to search for images is by means of a natural language query. A user can type a query (e.g. a sentence) comprising at least one query term into a text box. For example one query might be "show me all the photos of me at the sea". The client 202 can pass the query to the ISSF orchestration module 402, which may send the query to the image and semantic processing module 220. The image and semantic processing module 220 may process the query and return a list of image classification elements that can reasonably be associated with the query. Upon receipt of the list of image classification elements, the client 202 may search the image storage 306 for images with a final classification including at least one of the listed image classification elements.

A further way of searching for images is query by example. The query by example involves finding a response image similar to a query image. The query by example may be performed by comparing image classification elements such as low-level image features (e.g. spectrum, color variance, intensity). Thus, the response image found in response to a query by example may include an image classification element of the query image.

Architectures different from the architecture depicted in FIGS. 2 to 4 are also possible. However, the architecture of FIGS. 2 to 4 has the advantage that the processor intensive tasks of image segmentation, as well as semantic enrichment and semantic searching are carried out by the server 204. Accordingly, a service provider offering services corresponding to those performed on the server 204 could be in a position to obtain more revenue in comparison to a service provider offering different services. The architecture depicted in FIGS. 2 to 4 may also be more scalable and provide more optimized use of resources than alternative architectures. For example, if more tasks were performed by the client 202, the embedded system 100 could require additional capability, thereby becoming more complex and expensive. Concentrated computing power at the embedded system 100 could also remain unused for long periods, since it might only be required during the automatic tagging process. Moreover, concentrating computing power at the server 204 allows the computing power to be shared between a plurality of client applications.

The client server system described above may offer a user simplicity and efficiency. The user does not need to know what is running behind the scenes. Instead, the user can focus on what she wants and express it in her own words; the system does the rest.

Figure 5:
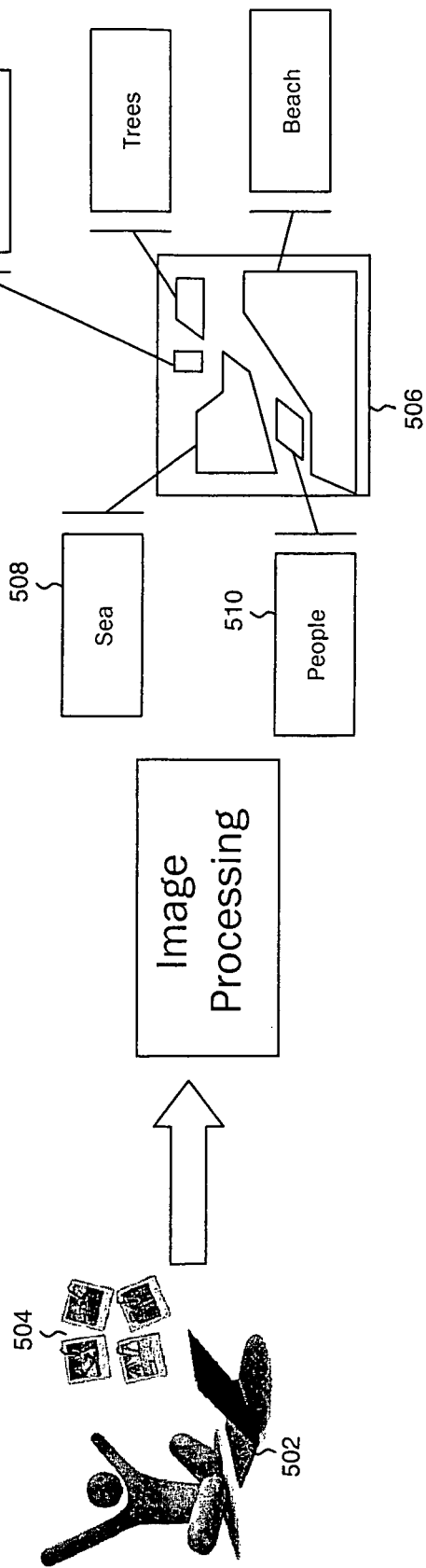
FIG. 5 shows an exemplary method for identifying image classification elements using the client-server system.

FIG. 5 shows an exemplary method for identifying image classification elements using the client 202 and the server 204.

A user 502 may upload a plurality of images 504, e.g. using the GUI 210. For example, the user 502 may come back from a holiday with a number of images stored in a digital camera. The user 502 may connect a digital camera to the embedded system 100 and all the images may be automatically uploaded from the digital camera to the embedded system 100.

Image components of an uploaded image 506 may be automatically identified, e.g. by the object identifier 406 and the image segmentation module 218. For example, one image component of the uploaded image 506 may be recognized and assigned a tag 508 of "Sea". Another image component of the uploaded image 506 may be recognized and assigned a tag 510 of "People". Similar assignments may be made for other components of the uploaded image, as depicted.

In summary, classification elements of an image can be identified using segmentation and annotation algorithms which identify objects, people, places, and natural elements depicted in the image. Identifying classification elements of an image may also be referred to as extracting classification elements from an image. Advantageously, the classification elements extracted from the image can be sent to the client 202 for verification or correction.

Figure 6:
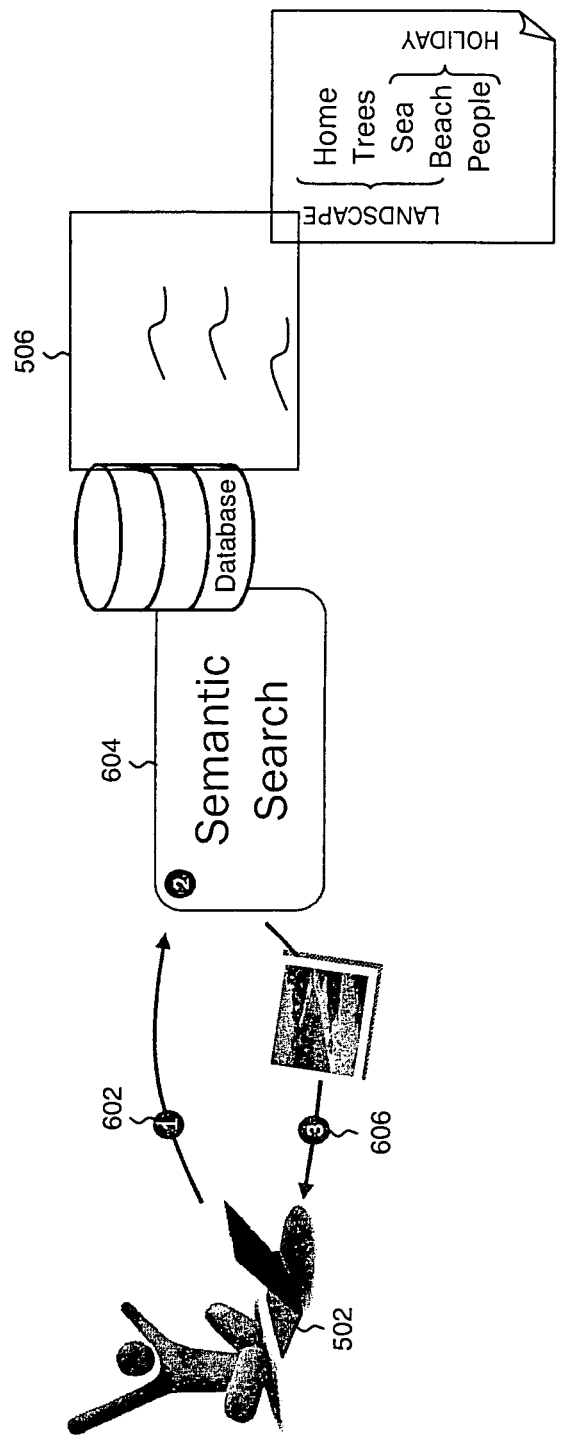
FIG. 6 shows image searching operations that are performed by the image processing system.

FIG. 6 shows an example of an image search, where the results of the image search are provided by the client 202 and the server 204.

Identified image classification elements of the uploaded image 506 can be organized into semantic groups, analyzed, and enriched with concepts and context. Identified image classification elements can be stored by means of the image and semantic processing module 220. The identified image classification elements may be stored together with a reference to the uploaded image for use in responding to subsequent queries.

A user can perform content oriented searches by formulating queries. Different types of queries such as natural language or query by example can be used. One or more images returned as the result of a user query can be browsed using the graphical user interface 210.

For example, at step 702, the user 502 formulates a natural language query using the graphical user interface 210, and the query is transmitted to the server 204. At step 704, a semantic search of uploaded images is performed based on the natural language query, and the uploaded image 506 is retrieved. At step 706, the results of the semantic search are returned to the user, i.e. the uploaded image 506. In the specific example of FIG. 5, the natural language query might be "show me all the photos of me at the sea".

Figure 7:
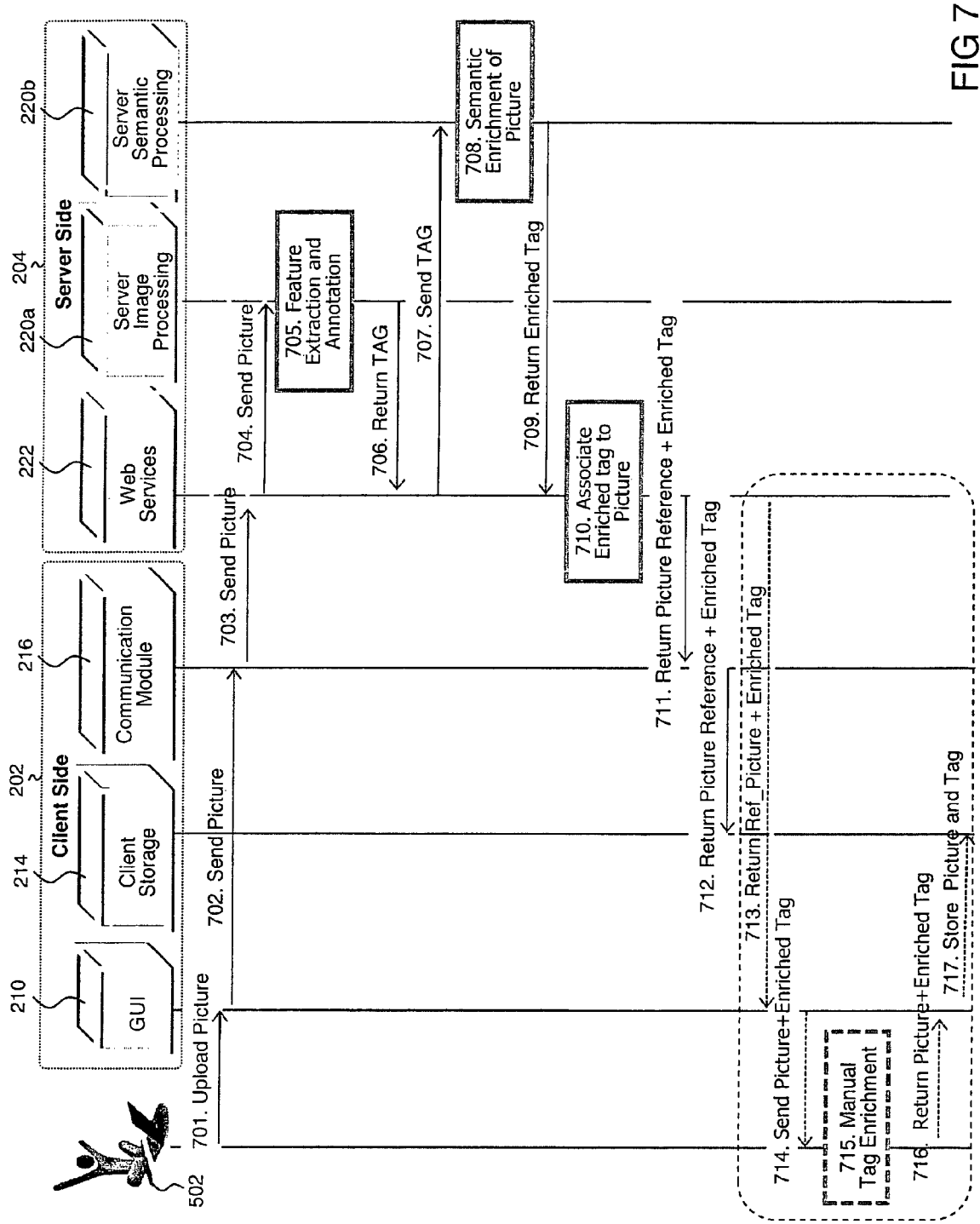
FIG. 7 shows swim lane diagram of a process for identifying image classification elements of a picture.
Figure 8:
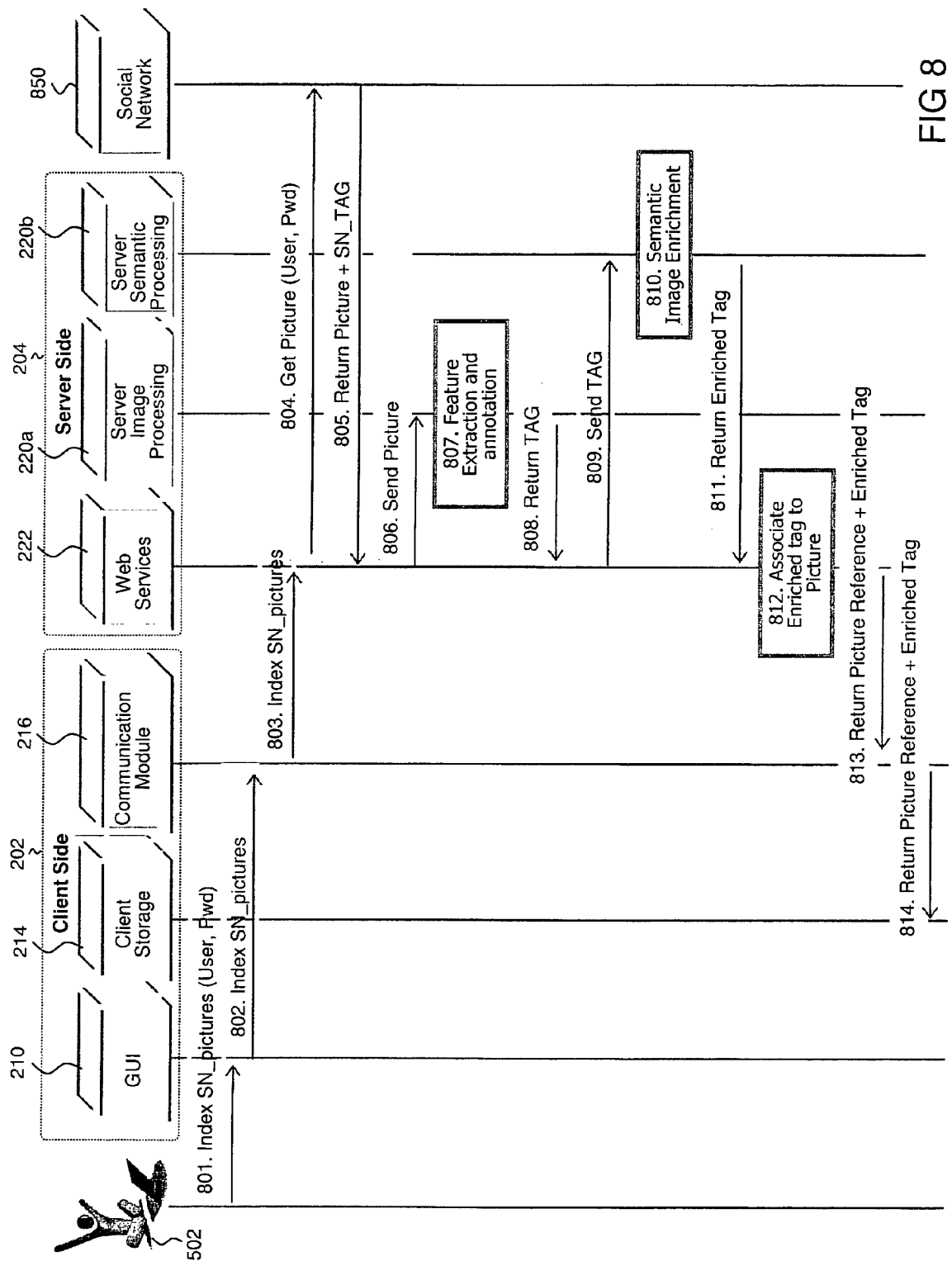
FIG. 8 shows a swim lane diagram of steps that can be performed in order to annotate and index an image retrieved from an image sharing network.
Figure 9:
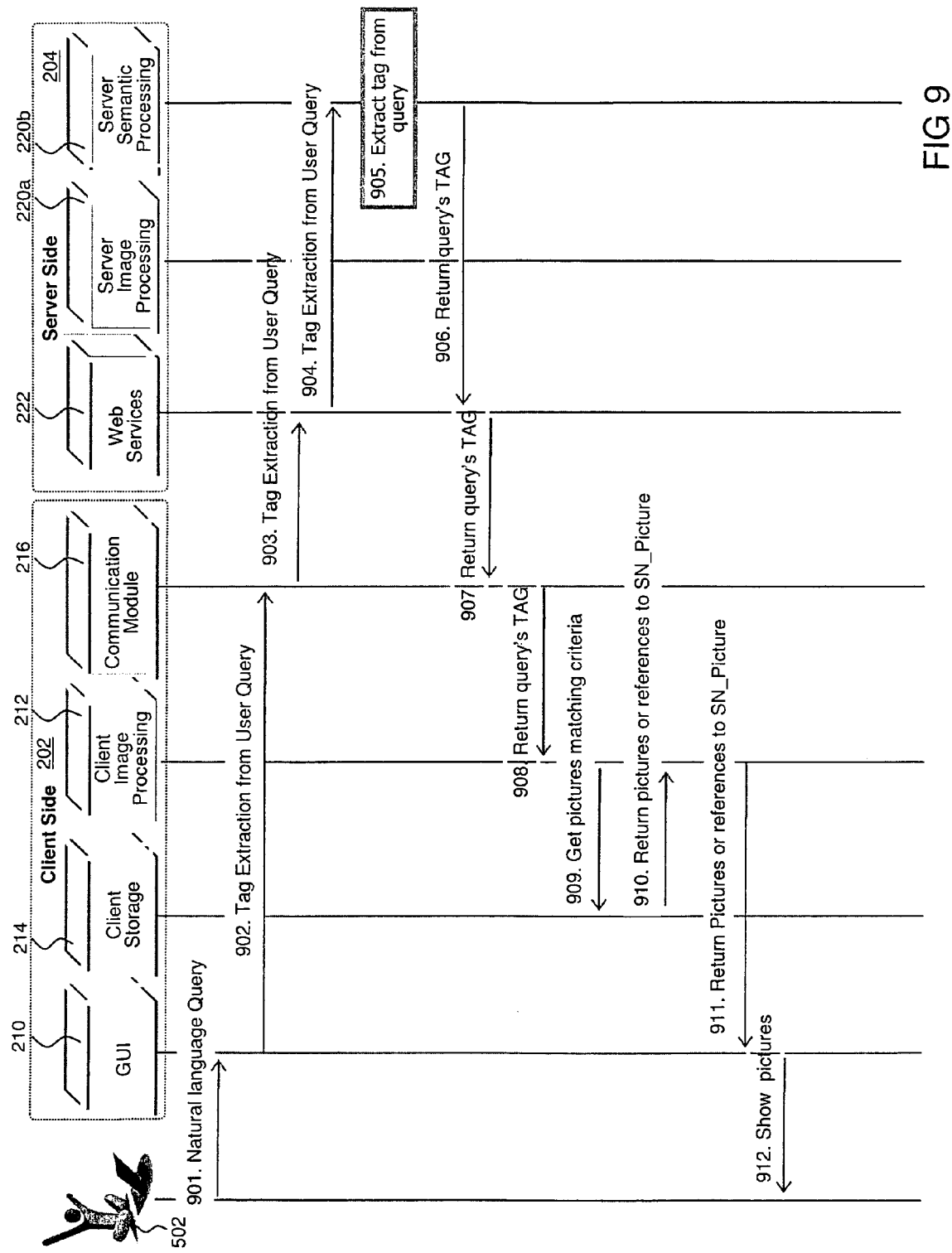
FIG. 9 shows a swim lane diagram depicting steps that may be carried out in order to search for a picture.

For the purposes of FIGS. 7 to 9, the image and semantic processing module 220 is divided into two components: a server image processing module 220a and a server semantic processing module 220b. The server image processing module 220a performs image segmentation and annotation functions. The server semantic processing module 220b performs categorization functions, e.g. based on the data generated by the server image processing module 220a.

FIG. 7 shows swim lane diagram of a process for identifying image classification elements of a picture.

At step 701, the user 502 uploads the picture to the client 202 using the GUI 210. The GUI 210 passes the picture to the client communication module 216 in step 702. Step 702 may be implemented by configuring the GUI 210 to store the picture in the RAM 106 and passing a reference to the picture to the client communication module 216. Step 702 could also be implemented by passing a reference to a file name representing the picture.

At step 703, the client communication module 216 passes the picture to the web services module 222. The web services module 222 passes the picture to the server image processing module 220a in step 704. Step 704 may be implemented similarly to step 702, e.g. the picture may be stored in a memory of the server 204 and a reference to the picture may be passed from the web services module 222 to the server image processing module 220a.

The server image processing module 220a identifies image classification elements at step 705. For example, the server image processing module 220a may perform feature extraction and annotation. The image classification elements (e.g. tags) may be returned to the web services module 222 in step 706. At step 707, the image classification elements may be sent to the server semantic processing module 220b.

At step 708, the server semantic processing module 220b may perform semantic enrichment of the image classification elements, i.e. the server semantic processing module 220b may enrich the image classification elements with semantic information. Performing semantic enrichment may include applying a rule to determine one or more categories of the picture based on the image classification elements. The rule may be a semantic rule. At step 709, image classification elements, including the categories, may be sent from the server semantic processing module 220b to the web services module 222.

The web services module 222 may associate the image classification elements with the picture at step 710. At step 711, a reference to the picture along with the enriched image classification elements may be returned to the client communication module 216. The client 202 may store the reference to the picture along with the image classification elements in the client storage 214 at step 712.

Steps 713 to 717 depict a process for manual correction or verification of the image classification elements. If steps 713 to 717 are performed, step 713 may be performed as an alternative to steps 711 and 712. In other words, step 713 may be performed after step 710. Steps 701 to 712 may be performed without performing manual correction or verification. Adding additional steps or removing steps is also possible.

After step 710, and as an alternative to steps 711 and 712, the reference to the picture and the image classification elements may be sent from the web services module 222 to the GUI 210. The user 502 may access the GUI 210, and in response, the picture and the image classification elements may be sent to the user 502 at step 714. At step 715, the user may manually correct or verify the image classification elements. At step 716, the user 502 may access the GUI 210 to return the picture and the possibly corrected image classification elements to the client 202. The picture and the image classification elements corrected or verified by the user may be stored in the client storage 214 at step 717.

FIG. 8 shows a swim lane diagram of a process for remote tagging and indexing of user pictures.

In the example of FIG. 8, the pictures are retrieved from a social network (SN) 850, e.g. Facebook, one or more image classification elements of the pictures are identified (i.e. one or more enriched tags are associated with the pictures), and references to the pictures are stored in the client storage 214 along with the image classification elements. The social network 850 may be understood as an example of an image sharing network.

Steps depicted in FIG. 8 which are given the same labels as the steps depicted in FIG. 7 may be implemented similarly. For example, steps 806 to 814 may be implemented similarly to steps 704 to 712.

At step 801, the GUI 210 is accessed and the client 202 receives a username and a password associated with the user 502 for the social network 850. Via the GUI 210, the client 202 receives instructions to index the pictures of the user 502 stored at the social network 850. At step 802, the received instructions are passed from the GUI 210 to the client communication module 216. The client communication module 216 passes the received instructions to the web services model 322 at step 803.

At step 804, the web services module 222 accesses the social network 850 with a username and the password in order to retrieve the pictures stored at the social network 850 that are associated with the user 502. At step 805, the pictures associated with the user 502, along with any picture annotations added by the social network 850, are sent to the web services module 222. The web services module 222 passes the pictures to the server image processing module 220a at step 806.

At step 807 the server image processing module 220a may perform feature extraction and annotation. In other words, the server image processing module 220a may identify image classification elements of the pictures.

Image classification elements (e.g. tags) determined by the server image processing module 220a may be sent to the web services module at step 808. At step 809, the image classification elements may be sent from the web services module 222 to the server semantic processing module 220b.

At step 810, the server semantic processing module 220b may perform semantic enrichment of the Image classification elements. In other words, the server semantic processing module 220b may enrich the Image classification elements with semantic information. Performing semantic enrichment may include applying a rule to determine one or more categories for each picture based on the Image classification elements. The rule may be referred to as a semantic rule.

At step 811, the Image classification elements may be sent from the semantic module 322 the web services module 222. The web services module 222 may associate the Image classification elements with the corresponding pictures at step 812. At step 813, picture references and associated Image classification elements may be sent from the web services module 222 to the client communication module 216. The client 202 may store the picture references along with the corresponding Image classification elements in the client storage 214 at step 814.

FIG. 9 shows a swim lane diagram depicting steps that may be carried out in order to search for a picture. The steps performed in FIG. 9 may be carried out after the steps performed in FIG. 8.

At step 901, the user 502 may access the GUI 210 in order to formulate a user query to find one or more pictures. The user query may be a natural language query and may comprise at least one query term (i.e. at least one word). At step 902, the user query may be forwarded from the GUI 210 to the client communication module 216 in order to extract one or more image classification elements (e.g. tags) from the user query. Extracting tags from the user query may also involve sending the user query from the client communication module 216 to the web services module 222 at step 903, and sending the user query from the web services module 222 to the server semantic processing module 220b at step 904. Processing and analysis required to extract tags from the user query may be performed by the server semantic processing module 220b at step 905. In some cases, extracting tags from the user query may involve deriving concepts from terms of the user query.

At step 906, the extracted tags may be sent from the server semantic processing module 220b to the web services module 222. The web services module 222 may send the tags to the client communication module 216 at step 907, and the client communication module 216 may pass the tags to the image processing module 212 at step 908.

At step 909, the image processing module 212 may interact with the client storage 214 in order to find one or more pictures matching the tags extracted from the user query.

At step 910, if pictures matching the tags are stored at the client 202, the server semantic processing module 220b may return the matching pictures to the search engine 212. In addition or alternatively, if the matching pictures are stored at the social network 850, references to the matching pictures may be returned to the search engine 212 at step 910. At step 911, the matching pictures or picture references are forwarded from the search engine 212 to the GUI 210. Matching pictures, stored at either the client 202 or at the social network 850, may be displayed at step 912.

The invention claimed is:

1. A method comprising:
receiving, by one or more processors, a user image;
identifying, by the one or more processors, a plurality of image classification elements of the user image by:
  assigning an initial classification to the user image,
    the initial classification being based on temporal data associated with the user image;
  determining at least one image label that globally describes content of the user image;
  calculating a label correctness value for each image label of the at least one image label;
  segmenting the user image to identify at least one image component of the user image;
  calculating a component correctness value for each image component of the at least one image component;
  correlating the at least one image label and the at least one image component using the label correctness value for each image label of the at least one image label and the component correctness value for each image component of the at least one image component,
    correlating the at least one image label and the at least one image component including selecting an image label, of the at least one image label, as a correlated image label based on the at least one image component and selecting an image component, of the at least one image component, as a correlated image component,
    another image label, of the at least one image label, being excluded based on the at least one image component;
  applying a rule to determine a category of the user image,
    the rule being based on at least one of the temporal data, the correlated image label, or the correlated image component; and
producing, by the one or more processors, a final classification of the user image,
  the final classification including the initial classification, the correlated image label, the correlated image component, and the category.

2. The method of claim 1, wherein identifying the plurality of image classification elements comprises:
receiving a geographic location associated with the image; and
determining a place name associated with the geographic location,
  wherein the final classification further includes the place name.

3. The method of claim 2, wherein identifying the plurality of image classification elements comprises:
determining an event based on the temporal data and the geographic location,
  wherein the final classification further includes the event.

4. The method of claim 1, wherein identifying the plurality of image classification elements comprises:
deriving a weather indicator from the temporal data,
  wherein the final classification further includes the weather indicator.

5. The method of claim 1, wherein segmenting the user image to identify the at least one image component of the user image comprises recognizing a plurality of image components, and
wherein identifying the plurality of image classification elements comprises:
  associating an image component classification with a first image component of the plurality of image components,
  wherein the final classification further includes the image component classification.

6. The method of claim 5, wherein the first image component is recognized as a face,
the method further comprising:
  associating a name with the face; and
  determining a mood based on an expression of the face,
    wherein the final classification further includes the name and the mood.

7. The method of claim 1, further comprising:
verifying the initial classification;
verifying the final classification of the user image,
  wherein training information is received for producing a subsequent final classification of a subsequent image.

8. The method of claim 1, further comprising at least one of:
associating the user image with a stored image based on the initial classification; or
associating the user image with a stored image based on the final classification.

9. The method of claim 1, wherein receiving the user image further comprises:
receiving a plurality of user images; and
retrieving at least one of the plurality of user images from an image sharing network.

10. The method of claim 9, further comprising:
displaying a plurality of image classification elements,
  wherein each image classification element is displayed based on a quantity of the plurality of user images associated with the image classification element;
receiving user input selecting an image classification element from the plurality of image classification elements; and
displaying a preview of a selected image from the plurality of user images, wherein the selected image classification element is included in the final classification of the selected image.

11. The method of claim 9, further comprising:
receiving a query including at least one query term;
matching the query term to a matching classification element; and
retrieving a matching image from the plurality of user images based on matching the query term to the matching classification element,
wherein the matching classification element is included in a final classification of the matching image.

12. The method of claim 9, wherein the plurality of user images comprises a query image and a response image, the method further comprising:
receiving a query comprising the query image;
matching a classification element of the query image with a classification element of the response image; and
retrieving the response image based on the query.

13. A non-transitory computer-readable medium storing instructions, the instructions comprising:
one or more instructions which, when executed by one or more processors, cause the one or more processors to:
receive a user image from a client,
the user image being associated with an initial classification that is based on temporal data associated with the user image;
identify a plurality of image labels that describes the user image;
calculate a label correctness value for each image label of the plurality of image labels;
segment the user image to identify an image component of the user image;
calculate a component correctness value for the image component;
correlate the plurality of image labels and the image component, using the label correctness value for each image label of the plurality of image labels and the component correctness value, to identify a correlated image label of the plurality of image labels,
another image label, of the plurality of image labels, being excluded;
apply a rule to determine a category of the user image,
the rule being applied to at least one of the temporal data, the correlated image label, or the image component; and
produce a final classification based on the initial classification, the correlated image label, the image component, and the category,
the final classification being transmitted to the client.

14. The non-transitory computer-readable medium of claim 13, where the one or more instructions to produce the final classification include one or more instructions to produce the final classification further based on a list of image components depicted in the user image and names of people depicted in the user image.

15. A system comprising:
a server to:
segment the user image to identify a user image from a client,
the user image being associated with an initial classification that is based on temporal data associated with the user image;
identify a plurality of image labels that globally describes the user image;
calculate a label correctness value for each image label of the plurality of image labels;
recognize an image component of the user image;
calculate a component correctness value for the image component;
correlate the plurality of image labels and the image component, using the label correctness value for each image label of the plurality of image labels and the component correctness value, to identify a correlated image label of the plurality of image labels,
another image label, of the plurality of image labels, being excluded;
apply a rule to determine a category of the user image,
the rule being applied to at least one of the temporal data, the correlated image label, or the image component;
produce a final classification based on the initial classification, the correlated image label, the image component, and the category; and
send to the client:
the final classification, and
a reference to the user image.

16. A system comprising:
one or more processors to:
receive a user image,
the user image including temporal data associated with the user image;
identify a plurality of image labels that globally describes the user image,
calculate a label correctness value for each image label the plurality of image labels;
segment the user image to identify an image component of the user image;
calculate a component correctness value for the image component;
correlate the plurality of image labels and the image component, using the label correctness value for each image label of the plurality of image labels and the component correctness value, to identify a correlated image label of the plurality of image labels;
apply a rule to determine a category of the user image,
the rule being applied to at least one of the temporal data, the correlated image label, or the image component;
produce a final classification based on the correlated image label, the image component, and the category; and
associate the final classification with the user image.

17. The system of claim 16, wherein the one or more processors are further to assign an initial classification to the user image based on a classification of at least one other image associated with correlated temporal data, and
wherein the final classification is produced further based on the initial classification.

18. The system of claim 16, wherein the one or more processors are further to retrieve a plurality of user images from at least one image sharing network associated with the user image.

19. The system of claim 18, wherein the one or more processors are further to associate the final classification with a reference to the user image accessible at the at least one image sharing network.

20. The system of claim 18, wherein the one or more processors are further to:
- receive a search query including at least one query term;
- identify a reference associated with a user image, based on a correlation between a final classification associated with the reference and the at least one query term;
- access, at an image sharing network, the user image associated with the identified reference; and
- display the accessed user image associated with the identified reference.

* * * * *